United States Patent
Nakagawa

(10) Patent No.: US 11,829,133 B2
(45) Date of Patent: Nov. 28, 2023

(54) DISTANCE BASED VEHICLE REMOTE CONTROL SYSTEMS AND METHODS FOR USING SAME

(71) Applicant: Toyota Motor Engineering & Manufacturing North America, Inc., Plano, TX (US)

(72) Inventor: Masashi Nakagawa, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 504 days.

(21) Appl. No.: 17/027,988

(22) Filed: Sep. 22, 2020

(65) Prior Publication Data
US 2022/0091606 A1    Mar. 24, 2022

(51) Int. Cl.
| | | |
|---|---|---|
| G05D 1/00 | (2006.01) |
| G01S 19/42 | (2010.01) |
| B60R 25/01 | (2013.01) |
| B60R 25/24 | (2013.01) |
| H04N 7/18 | (2006.01) |
| B60R 16/03 | (2006.01) |
| H04L 67/125 | (2022.01) |
| G08C 19/00 | (2006.01) |
| B60Q 5/00 | (2006.01) |

(52) U.S. Cl.
CPC ............ *G05D 1/0038* (2013.01); *B60Q 5/001* (2013.01); *B60R 16/03* (2013.01); *B60R 25/01* (2013.01); *B60R 25/24* (2013.01); *G01S 19/42* (2013.01); *G08C 19/00* (2013.01); *H04L 67/125* (2013.01); *H04N 7/185* (2013.01)

(58) Field of Classification Search
CPC ...... G05D 1/0038; B60Q 5/001; B60R 16/03; B60R 25/01; B60R 25/24; G01S 19/42; G08C 19/00; H04L 67/125; H04N 7/185; H04W 4/023; H04W 4/40
USPC .......................................................... 701/2
See application file for complete search history.

(56) References Cited

U.S. PATENT DOCUMENTS

| | | | | |
|---|---|---|---|---|
| 5,844,173 A | * | 12/1998 | Etienne | H01M 50/216 174/250 |
| 7,304,564 B2 | | 4/2007 | Yang et al. | |
| 10,434,987 B2 | | 8/2019 | Yoo et al. | |

(Continued)

FOREIGN PATENT DOCUMENTS

| | | | |
|---|---|---|---|
| AU | 2014-101356 | * | 12/2014 |
| CN | 103036972 | * | 4/2013 |
| JP | 2013-067364 | * | 4/2013 |

*Primary Examiner* — Muhammad Shafi
(74) *Attorney, Agent, or Firm* — Dinsmore & Shohl LLP

(57) ABSTRACT

A vehicle remote control system includes a server including a transceiver and a controller. The transceiver is configured to receive location data from a vehicle and location data from a remote device. The controller is configured to receive an operating instruction signal from the remote device, the operating instruction signal including instructions to operate one or more components of the vehicle. A distance between the vehicle and the remote device is determined based on the location data from the vehicle and the location data from the remote device. The operating instruction signal is transmitted to the vehicle in response to a determination that the distance between the vehicle and the remote device is equal to or less than a corresponding threshold distance.

14 Claims, 3 Drawing Sheets

(56) References Cited

U.S. PATENT DOCUMENTS

| | | |
|---|---|---|
| 2015/0019084 A1 | 1/2015 | Chen et al. |
| 2015/0035656 A1 | 5/2015 | Franz et al. |
| 2015/0298653 A1* | 10/2015 | Schwartz .............. F02N 11/101 |
| | | 701/2 |
| 2019/0023223 A1* | 1/2019 | Yoo ....................... B60R 25/043 |

* cited by examiner

DISTANCE BASED VEHICLE REMOTE CONTROL SYSTEMS AND METHODS FOR USING SAME

TECHNICAL FIELD

The present specification generally relates to vehicle remote control systems and method for controlling operation of a vehicle from a remote device and, more specifically, controlling operation of one or more components of the vehicle based on distance between the remote device and the vehicle.

BACKGROUND

Conventional vehicles allow for a user to send a remote control request to a vehicle such as, for example, a remote start signal, a door unlock signal, and the like. However, these remote control requests operation without restriction based on a location of the user. However, this may result in an unintended operation of the vehicle, such as the vehicle starting, when the user sends a request to the vehicle and is at an excessive distance from the vehicle.

Accordingly, a need exists for improved vehicle remote control systems in which the vehicle control is dependent on a distance between the remote control device and the vehicle to prevent unintentional control over the vehicle when the user is outside of a predetermined distance from the vehicle corresponding to the user request.

SUMMARY

In one embodiment, a vehicle remote control system includes a server including a transceiver and a controller. The transceiver is configured to receive location data from a vehicle and location data from a remote device. The controller is configured to receive an operating instruction signal from the remote device, the operating instruction signal including instructions to operate one or more components of the vehicle. A distance between the vehicle and the remote device is determined based on the location data from the vehicle and the location data from the remote device. The operating instruction signal is transmitted to the vehicle in response to a determination that the distance between the vehicle and the remote device is equal to or less than a corresponding threshold distance.

In another embodiment, a method for operating a vehicle includes receiving, at a server, location data from the vehicle. Location data from a remote device is received at the server. An operating instruction signal from the remote device is received at the server. The operating instruction signal includes instruction to operate one or more components of the vehicle. A distance between the vehicle and the remote device is determined based on the location data from the vehicle and the location data from the remote device. The operating instruction signal is transmitted to the vehicle in response to a determination that the distance between the vehicle and the remote device is equal to or less than a corresponding threshold distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
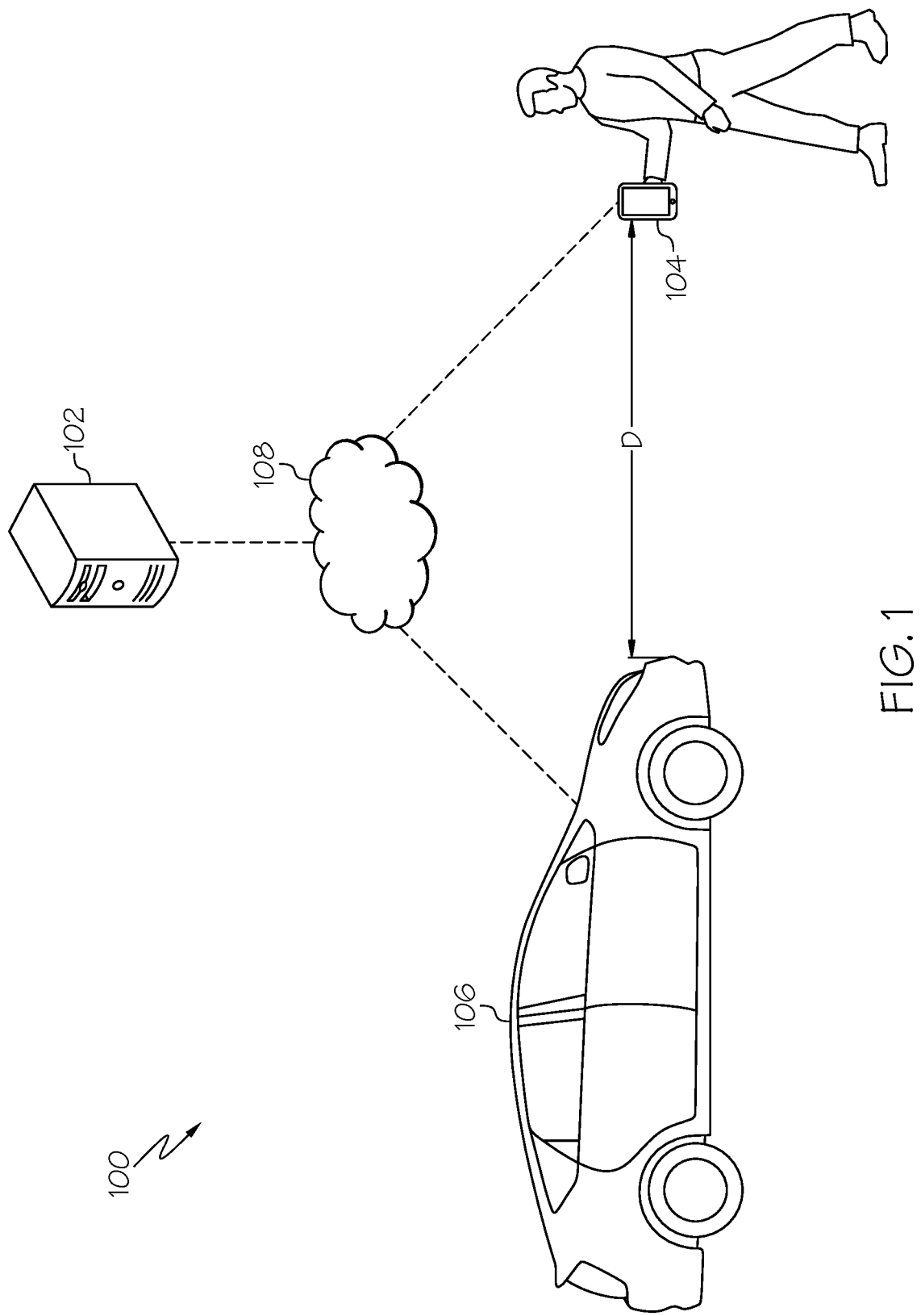
FIG. 1 schematically depicts a vehicle remote control system including a server communicating with a vehicle and a remote device via a network, according to one or more embodiments shown and described herein.

A vehicle remote control system includes a server including a transceiver and a controller. The transceiver is configured to receive location data from a vehicle and location data from a remote device. The controller is configured to receive an operating instruction signal from the remote device, the operating instruction signal including instructions to operate one or more components of the vehicle. A distance between the vehicle and the remote device is determined based on the location data from the vehicle and the location data from the remote device. The operating instruction signal is transmitted to the vehicle in response to a determination that the distance between the vehicle and the remote device is equal to or less than a corresponding threshold distance.

The vehicle remote control systems and methods limit operation instructions to be sent to a vehicle when the user is within a predetermined distance of the vehicle or, alternatively, a bypass operation is performed. Thus, operation of a vehicle is prevented when the user is outside of a predetermined range of the vehicle.

Various embodiments of the systems and methods and the operation of the systems are described in more detail herein. Whenever possible, the same reference numerals will be used throughout the drawings to refer to the same or like parts.

Referring now to FIG. 1, a vehicle remote control system 100 is shown generally including a server 102 configured to communicate with a remote device 104 and a vehicle 106 via a network 108. As shown, the remote device 104 and the vehicle 106 are separated by a distance D. As discussed in more detail herein, the server 102 is configured to receive an operating instruction signal from the remote device 104 via the network 108 and, in response to the distance D being equal to or less than a corresponding threshold distance or, alternatively, a bypass signal being received at the server 102, transmit the operating instruction signal to the vehicle 106 via the network 108. The operating instruction signal includes instruction to operate one or more components of the vehicle 106. The distance D is determined by analyzing location data received from the remote device 104 indicating a location of the remote device 104 and location data received from the vehicle 106 indicating a location of the vehicle 106.

The server 102 may be a remote server such as a cloud server. In some embodiments, the server 102 may be a local server including, but not limited to, a roadside unit, an edge server, and the like. The server 102 may communicate with the remote device 104 and the vehicle 106 in an area covered by the server 102. The server 102 may communicate with other servers that cover different areas. The server 102 may communicate with a remote server and transmit information collected by the server 102 to the remote server.

The remote device 104 may be any user-operated electronic device configured to transmit the operating instruction signal to the vehicle 106. As a non-limiting example, the remote device 104 may be a mobile phone or a key fob. In use, a user may operate any one of a plurality of controls or operate a user interface of the remote device 104 to select the instruction to be included in the operating instruction signal transmitted to the server 102. By operating the remote device 104, the instruction may include a command for operating one or more components of the vehicle 106, such as, for example, an ignition, windows, doors, including a rear door, trunk, tailgate, or hood/sunroof, horn, an outlet power supply, a seat positioning device (sliding and folding), turn signals, an HVAC, a battery, a multimedia device, audio and/or video capture devices, a lighting device, and the like. As non-limiting examples, the operating instruction signal sent from the remote device 104 to the vehicle 106 may include instruction to operate an ignition of the vehicle 106 or perform a vehicle start operation, open one or more windows of the vehicle 106, open one or more doors of the vehicle 106, including a rear door or tailgate, activate a horn of the vehicle 106, control power to an outlet power supply of the vehicle 106, slide or fold a seat of the vehicle 106, activate turn signals of the vehicle 106, control an HVAC of the vehicle 106, permit and/or prohibit charging of a battery of the vehicle 106, control (turn on/off) a multimedia device of the vehicle 106, activate one or more audio and/or video capture devices of the vehicle 106, activate a lighting device, and/or the like.

The vehicle 106 may be a vehicle including an automobile or any other passenger or non-passenger vehicle such as, for example, a terrestrial, aquatic, and/or airborne vehicle. However, although referred to as a "vehicle" herein, it should be appreciated that the vehicle 106 may be any suitable electronic device configured to receive an operating instruction signal from the remote device 104. As discussed herein, the vehicle 106 includes one or more components to be operated in response to receiving the operating instruction signal from the server 102, originally transmitted by the remote device 104.

Figure 2:
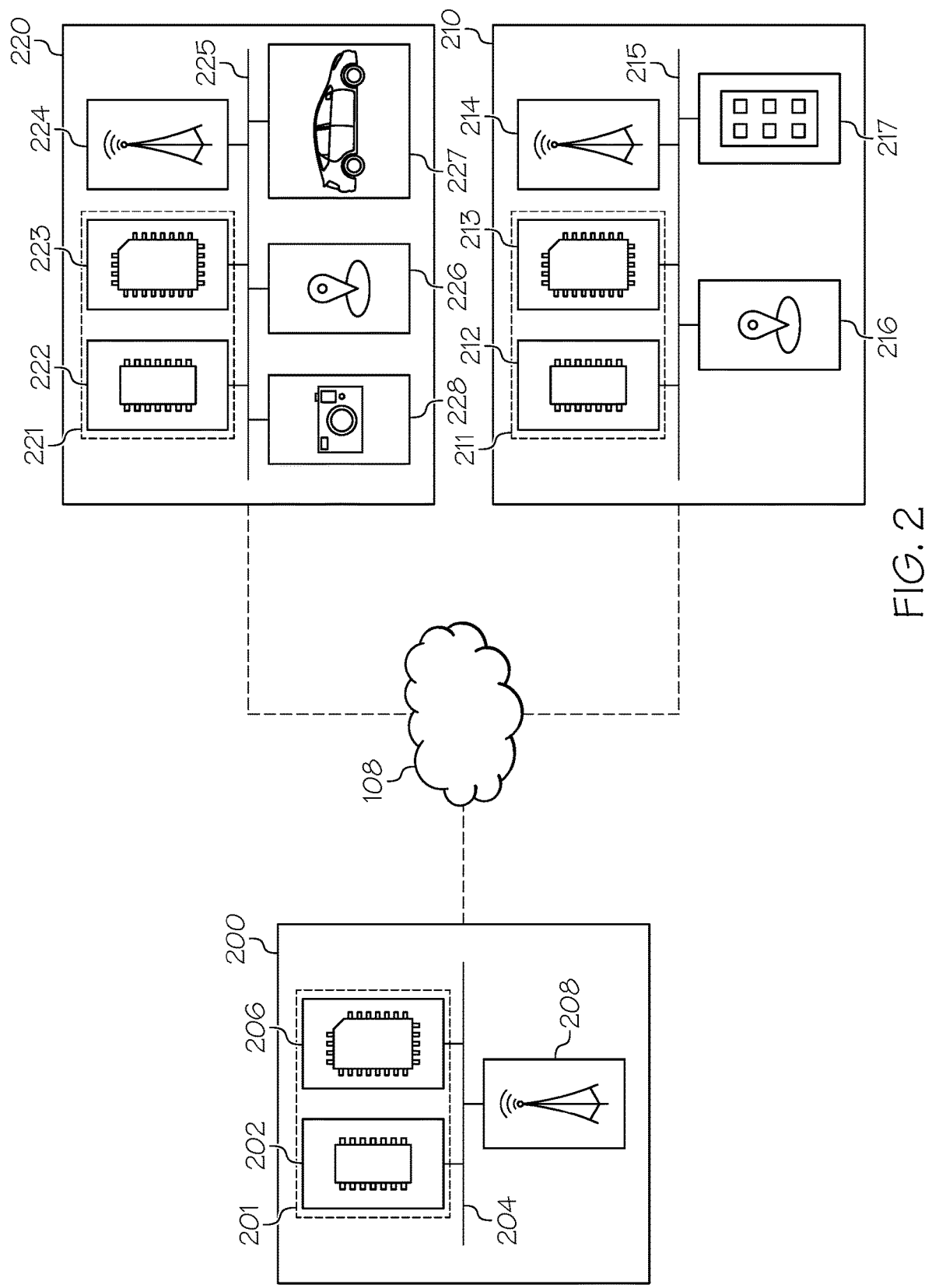
FIG. 2 schematically depicts components of the vehicle remote control system, according to one or more embodiments shown and described herein.

FIG. 2 depicts a schematic diagram of the vehicle remote control system 100 including a server system 200 configured to communicate with a remote device system 210 and a vehicle system 220, according to one or more embodiments shown and described herein. It is noted that, while the server system 200, the remote device system 210, and vehicle system 220 are depicted in isolation, each of the server system 200, the remote device system 210, and the vehicle system 220 may be included within the server 102, the remote device 104, and the vehicle 106 of FIG. 1, respectively.

The server system 200 includes a first controller 201 including one or more processors 202 and one or more memory modules 206. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the server system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the server system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 include machine readable instructions that, when executed by the one or more processors 202, cause the server system 200 to analyze the operating instruction signal transmitted from the remote device system 210 and, if a condition is satisfied, transmit the operating instruction to the vehicle system 220. The one or more memory modules 206 include a database of threshold distances corresponding to each of the one or more components of the vehicle 106 and, in some embodiments, specific operating instructions of the one or more components. In embodiments, the one or more memory modules 206 may include various groups of the one or more components of the vehicle 106 to be operated under similar conditions. For example, a first group of one or more components of the vehicle 106 may be operated under a first set of conditions, such as the distance D between the remote device 104 and the vehicle 106 being within a first range, a second group of one or more components of the vehicle 106 may be operated under a second set of conditions, such as the distance D between the remote device 104 and the vehicle 106 being between a second range further from the vehicle 106 than the first range. As a non-limiting example, the first group may include a door, including a tailgate, a sunroof, and a hood, of the vehicle 106, windows of the vehicle 106, an outlet power supply of the vehicle 106, and a seat positioning device of the vehicle 106, and the second group may include a multimedia device, a horn, and a lighting device, turn signals. Thus, the one or more components of the first group may be operated when different conditions are satisfied as compared to those conditions associated with the one or more components in the second group. As discussed in more detail herein, the condition may be satisfied if the server system 200 determines that the distance D, which is determined by analyzing the location data from the remote device 104 and location data from the vehicle 106, is equal to or below the threshold distance associated with the particular component and/or the instruction of the particular component of the operating instruction signal.

As a non-limiting example, an operating instruction signal received at the server system 200 from the remote device 104 may include an instruction to perform a vehicle start operation by starting an ignition of the vehicle 106. As such, the one or more memory modules 206 may include a threshold distance corresponding to the ignition of the vehicle 106 of, for example, 1 mile. Thus, in response to the server system 200 determining that the distance D is equal to or less than the threshold distance corresponding to the ignition of the vehicle 106, i.e., 1 mile, the operating instruction signal is sent to the vehicle system 220 from the server system 200 for carrying out the instruction, i.e., starting the ignition of the vehicle 106.

As another non-limiting example, an operating instruction signal received at the server system 200 from the remote device system 210 may include an instruction to perform a door unlock operation by unlocking a door of the vehicle 106. The one or more memory modules 206 may include a threshold distance corresponding to the door of the vehicle 106 of, for example, 100 feet. Thus, in response to the server system 200 determining that the distance D is equal to or less than the threshold distance corresponding to the door unlock of the vehicle 106, i.e., 100 feet, the operating instruction signal is sent to the vehicle system 220 from the server system 200 for carrying out the instruction, i.e., unlocking the door of the vehicle 106.

It should be appreciated that the examples discussed herein are not intended to be limiting to the scope of the present disclosure. As such, the operating instruction signal may include any suitable instruction for operating one or more components of the vehicle 106 and corresponding to a threshold distance stored in the one or more memory modules 206 of the server system 200. As such, the one or more memory modules 206 includes at least a first threshold distance corresponding to a first component of the vehicle 106 and a second threshold distance corresponding to a second component of the vehicle 106 in which the first threshold distance is different than the second threshold distance. Further, the threshold distances associated to each of the one or more components of the vehicle 106 may be adjustable. Specifically, in embodiments, the threshold distances may be manually adjusted at the server 102, the remote device 104, and/or the vehicle 106.

Still referring to FIG. 2, the server system 200 includes network interface hardware 208 for communicatively coupling the server system 200 to the remote device system 210 and the vehicle system 220. The network interface hardware 208 can be communicatively coupled to the communication path 204 and can be any device capable of receiving and transmitting data via the network 108. Accordingly, the network interface hardware 208 can include a communication transceiver for sending and/or receiving any wired or wireless communication. For example, the network interface hardware 208 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 208 includes hardware configured to operate in accordance with the Bluetooth® wireless communication protocol. For example, the network interface hardware 208 of the server system 200 may receive the operating instruction signal from the remote device system 210 and transmit the operating instruction signal to the vehicle system 220. In addition, the network interface hardware 208 of the server system 200 may receive the location data from the remote device system 210 and the location data from the vehicle system 220.

Still referring to FIG. 2, the server system 200 may be communicatively coupled to the remote device system 210 and the vehicle system 220 by the network 108. In one embodiment, the network 108 may include one or more computer networks (e.g., a personal area network, a local area network, or a wide area network), cellular networks, satellite networks and/or a global positioning system and combinations thereof. Accordingly, the server system 200 can be communicatively coupled to the network 108 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the remote device system 210 includes a second controller 211 including one or more processors 212 and one or more memory modules 213, network interface hardware 214, and a communication path 215 communicatively connected to the other components of the remote device system 210. The components of the remote device system 210 may be structurally similar to and have similar functions as the corresponding components of the server system 200 (e.g., the one or more processors 212 corresponds to the one or more processors 202, the one or more memory modules 213 corresponds to the one or more memory modules 206, the network interface hardware 214 corresponds to the network interface hardware 208, and the communication path 215 corresponds to the communication path 204).

The remote device system 210 includes a location sensor 216 communicatively coupled to the other components of the remote device system 210 via the communication path 215. The location sensor 216 may be, for example, a GPS module, configured to capture location data indicating a location of the remote device 104, which is transmitted to the server system 200.

The remote device system 210 also includes a control device 217 communicatively coupled to the other components of the remote device system 210 via the communication path 215. The control device 217 includes one or more controls for selecting between various instructions to be included in the operating instruction signal sent to the server system 200. The one or more controls may be any suitable user operating device such as, for example, buttons or the like. In some embodiments, the control device 217 includes a user interface, such as a touch screen user interface, for selecting the instruction of the operating instruction signal.

Still referring to FIG. 2, the vehicle system 220 includes a third controller 221 including one or more processors 222 and one or more memory modules 223, network interface hardware 224, and a communication path 225 communicatively connected to the other components of the vehicle system 220. The components of the vehicle system 220 may be structurally similar to and have similar functions as the corresponding components of the server system 200 (e.g., the one or more processors 222 corresponds to the one or more processors 202, the one or more memory modules 223 corresponds to the one or more memory modules 206, the network interface hardware 224 corresponds to the network interface hardware 208, and the communication path 225 corresponds to the communication path 204).

The vehicle system 220 also includes a location sensor 226 communicatively coupled to the other components of the vehicle system 220 via the communication path 225. The location sensor 226 of the vehicle system 220 may be structurally similar to and have similar functions as the location sensor 226 of the remote device system 210. Thus, the location sensor 226 of the vehicle system 220 is configured to capture location data indicating a location of the vehicle 106, which is transmitted to the server system 200. Subsequently, the server system 200 analyzes the location data received from the remote device system 210 and the location data received from the vehicle system 220 to determine the distance D between the remote device 104 and the vehicle 106.

Referring still to FIG. 2, the vehicle system 220 also includes a vehicle control unit 227 communicatively coupled to the other components of the vehicle system 220 via the communication path 225, as well as other components of the vehicle 106 separate from the vehicle system 220 such as, for example, the ignition, the doors, the horn, and the like. The vehicle control unit 227 is configured to execute the instructions of the operating instruction signal to control the one or more components of the vehicle 106 in response to receiving the operating instruction signal from the server system 200.

Referring still to FIG. 2, the vehicle system 220 may include one or more imaging devices 228 such as, for example, a camera. In some embodiments, the one or more imaging devices 228 may include one or more optical components, such as a mirror, fish-eye lens, or any other type of lens. In some embodiments, the one or more imaging devices 228 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein could include one or more LIDAR sensors, radar sensors, sonar sensors, or other types of sensors and that such data could be integrated into or supplement the data collection described herein.

As described in more detail herein, in embodiments, the one or more imaging devices 228 is configured to capture image data in response to receiving a signal from the server system 200 indicating that the distance D exceeds a corresponding threshold distance and, thus, preventing the operating instruction signal from being transmitted to the vehicle system 220.

Figure 3:
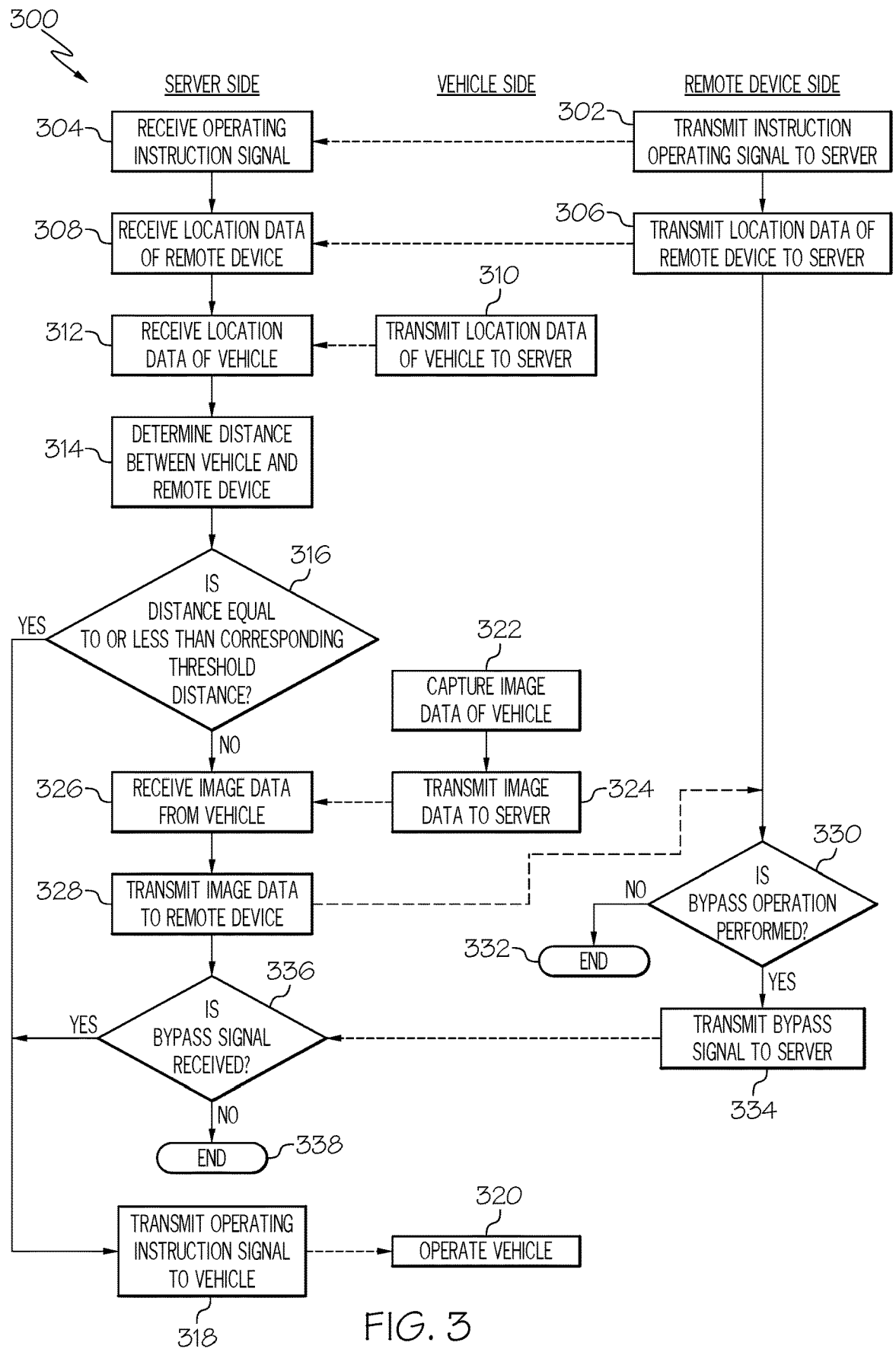
FIG. 3 schematically depicts a flowchart of a method for operating the vehicle utilizing the vehicle remote control system, according to one or more embodiments shown and described herein.

FIG. 3 depicts a method 300 for transmitting instructions to the vehicle 106 from the remote device 104, according to one or more embodiments shown and described herein. The method 300 is described herein with reference to FIGS. 1 and 2.

At step 302, a user operates the remote device 104 to select a specific instruction to be transmitted to the vehicle 106 to operate one or more components of the vehicle 106. In embodiments, the user selects an instruction, for example, initiating a vehicle start operation/starting an ignition, unlocking a door, opening a door, sounding a horn, and the like. The user may select the specific instruction by operating the control device 217 and/or a user interface on the remote device 104 including any number of buttons or suitable controls. Once the specific instruction is selected, an operating instruction signal including the instruction is transmitted to the server system 200 of the server 102.

At step 304, the server system 200 receives the operating instruction signal from the remote device system 210 and identifies the instruction within the operating instruction signal. Specifically, the server system 200 matches the one or more components of the vehicle 106 associated with the instruction with a corresponding threshold distance stored in the one or more memory modules 206 of the server system 200, as discussed herein. For example, when the instruction identifies a start operation of an ignition of the vehicle 106, the server system 200 utilizes a threshold distance corresponding to the ignition of the vehicle 106, for example, 1 mile. The corresponding threshold distance is utilized for purposes of determining whether the operating instruction signal should be transmitted to the vehicle 106. Similarly, when the instruction identifies an unlocking operation of a door lock of the vehicle 106, the server system 200 utilizes a threshold distance corresponding to the ignition of the vehicle 106, for example, 100 feet. In some embodiments, if the operating instruction signal includes instructions for more than one component of the vehicle 106, more than one threshold distance may be utilized in which each threshold distance corresponds to an associated component of the vehicle 106.

At step 306, the location sensor 216 of the remote device system 210 captures location data of the remote device 104, which identifies a location of the remote device 104. In embodiments, the remote device system 210 transmits the location data of the remote device 104 at predetermined time intervals. In other embodiments, the remote device system 210 captures and transmits the location data of the remote device 104 in response to the remote device system 210 transmitting the operating instruction signal to the server system 200. Further, in some embodiments, the location data may be included in the operating instruction signal itself such that the number of individual transmissions to the server system 200 is reduced.

At step 308, the server system 200 receives the location data of the remote device 104 and stores the location data of the remote device 104. Upon receiving the location data of the remote device 104, the server system 200 is configured to identify the location of the remote device 104.

At step 310, the location sensor 226 of the vehicle system 220 captures location data of the vehicle 106, which identifies a location of the vehicle 106. In embodiments, the vehicle system 220 transmits location data of the vehicle 106 at predetermined time intervals. In other embodiments, the vehicle system 220 captures and transmits the location data of the vehicle 106 in response to the vehicle system 220 receiving a signal from the server system 200 indicating that the server system 200 has received the operating instruction signal from the remote device system 210.

At step 312, the server system 200 receives the location data of the vehicle 106 and stores the location data of the vehicle 106. Upon receiving the location data of the vehicle 106, the server system 200 is configured to identify the location of the vehicle 106.

At step 314, in response to identifying the location of the remote device 104 and the location of the vehicle 106, the server system 200 analyzes the location of the remote device 104 and the location of the vehicle 106 to determine a distance D between the remote device 104 and the vehicle 106 at the time which the location data was transmitted to the server system 200.

At step 316, the server system 200 determines whether the distance D between the remote device 104 and the vehicle 106 is equal to or less than the corresponding threshold distance, i.e., the threshold distance determined in step 304 corresponding to the or more components of the vehicle 106 specified in the instruction of the operating instruction signal. If the distance D between the remote device 104 and the vehicle 106 is equal to or less than the corresponding threshold distance, the server system 200 transmits the operating instruction signal to the vehicle system 220 at step 318. As noted above, the operating instruction signal may include more than one component and, thus, be associated with more than one corresponding threshold distance. In this instance, the operating instruction signal may be parsed to allow only a permitted portion of the operating instruction signal to be transmitted to the vehicle 106.

At step 320, the vehicle system 220 receives the operating instruction signal and identifies the one or more components of the vehicle 106 to be operated as indicated by the instruction of the operating instruction signal. Thereafter, the vehicle control unit 227 of the vehicle system 220 executes the instruction to operate the one or more components of the vehicle 106, e.g., start the ignition of the vehicle 106, unlock the door, open the door, sound the horn, or the like.

In embodiments, the operating instruction signal may not be transmitted to the vehicle system 220 if it is determined that the distance D between the remote device 104 and the vehicle 106 exceeds the corresponding threshold distance identified in step 304. However, in some embodiments, the vehicle remote control system 100 may permit the remote device 104 to instruct the server system 200 to perform a bypass procedure and instruct the server system 200 to transmit the operating instruction signal to the vehicle system 220 in response to a determination that the distance D exceeds the corresponding threshold distance. However, in some embodiments in which the bypass procedure is provided, one or more components may be operated without requiring the bypass procedure. For example, the bypass procedure may be initiated when the operating instruction signal includes instruction to operate one or more components of the first group or the second group such as, for example, a door or window of the vehicle 106. However, the bypass procedure may not be initiated when the one or more components of the operating instruction include one or more components of a third group such as, for example, an HVAC of the vehicle 106, a battery of the vehicle 106, or an audio and/or video capture device of the vehicle 106. Thus, while certain components may be subject to the bypass procedure, other components may not be.

At step 322, the bypass procedure includes capturing image data of the vehicle 106 by the imaging device 228. In embodiments, the imaging device 228 may be configured to capture image data of the interior and/or the exterior of the vehicle 106. The image data may include one or more still images or, in some embodiments, one or more video files. In some embodiments, the imaging device 228 may be configured to capture the image data at predetermined time intervals. In other embodiments, the imaging device 228 may be configured to capture the image data in response to the vehicle system 220 receiving a signal from the server system 200 indicating that the distance D between the remote device 104 and the vehicle 106 exceeds the threshold distance. Further, in some embodiments, the signal transmitted to the vehicle system 220 from the server system 200 may identify the one or more components of the vehicle 106 to be operated and the imaging device 228 may be configured to capture image data corresponding to the one or more components. As a non-limiting example, if the signal indicates that a door of the vehicle 106 is to be opened, the imaging device 228 may be configured to capture image data specific to the door to notify the user as to whether there is an object in an opening path of the door. As another non-limiting example, if the signal indicates that the ignition of the vehicle 106 is to be started, the imaging device 228 may capture image data of an exterior of the vehicle 106 to notify the user as to whether the vehicle 106 is parked in a garage. At step 324, the vehicle system 220 transmits the captured image data to the server system 200. At step 326, the server system 200 receives the image data from the vehicle system 220. At step 328, the server system 200 transmits the image data to the remote device system 210.

At step 330, the remote device system 210 receives the image data and may display the image data on the remove device, such as on a display screen on the remote device 104, to permit the user to perform a bypass operation on the remote device 104. In embodiments, the remote device system 210 may also receive a prompt from the server system 200 including text such as, for example, "Continue?" or "Is it okay to proceed with this operation?" The prompt may be displayed in combination with the image data or after the image data is displayed on the display screen on the remote device 104. In embodiments, a user is permitted to operate the control device 217 of the remote device system 210 to perform the bypass operation such as transmitting a bypass signal to the server system 200 after viewing the image data on the remote device 104 and, in some embodiments, accepting the prompt displayed on the displays screen on the remote device 104. This provides confirmation that the user wishes to carry out the instruction of the operating instruction signal even when the distance D between the remote device 104 and the vehicle 106 exceeds the threshold distance. As such, it should be appreciated that the image data and the prompt, if provided, seek to make the user aware of a current status of the vehicle 106 and potential risk, for example, a person standing next to a door of the vehicle 106 to be opened, when the user is not within range of the vehicle 106.

At step 332, the method 300 ends if the bypass operation is not performed by the user at the remote device 104. Thus, the operating instruction signal is not transmitted from the server system 200 to the vehicle system 220 and the vehicle 106 does not operate the one or more components of the vehicle 106 as indicated by the instruction of the operating instruction signal. However, in response to the bypass operation being performed by the user at the remote device 104, the method 300 proceeds to step 334 to transmit the bypass signal to the server system 200.

At step 336, a determination is made at the server system 200 as to whether the bypass signal is received from the remote device 104. If the bypass signal is not received, the method 300 proceeds to step 338 and ends, thereby preventing the operating instruction signal from being transmitted to the vehicle system 220. Alternatively, if it is determined that the server system 200 does receive the bypass signal from the remote device system 210, the method 300 proceeds to step 318, discussed herein, in which the operating instruction signal is transmitted to the vehicle system 220 and the one or more components are operated in accordance with the instruction of the operating instruction signal.

From the above, it is to be appreciated that defined herein is a vehicle remote control system configured to transmit an operating instruction signal from a remote device to a vehicle if a distance between the remote device and the vehicle is equal to or less than a distance threshold corresponding to instruction for operating one or more components of the vehicle. Alternatively, if the distance between the remote device and the vehicle is greater than the corresponding distance threshold, a bypass operation may be performed at the remote device when viewing image data captured at the vehicle to permit the operating instruction signal to be sent to the vehicle and the one or more components of the vehicle to be operated.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle remote control system comprising:
   a server comprising:
      a transceiver configured to receive location data from a vehicle and location data from a remote device; and
      a controller configured to:
         receive an operating instruction signal from the remote device, the operating instruction signal including instructions to operate one or more components of the vehicle;
         determine a distance between the vehicle and the remote device based on the location data from the vehicle and the location data from the remote device; and
         transmit the operating instruction signal to the vehicle in response to a determination that the distance between the vehicle and the remote device is equal to or less than a corresponding threshold distance; wherein, the one or more components of the vehicle comprise a first component and a second component; and a first threshold distance corresponding to the first component is different than a second threshold distance corresponding to the second component.

2. The vehicle remote control system of claim 1, wherein the first component and the second component of the vehicle are selected from the group consisting of an ignition, a door, a door lock, a hood, a window, and a horn.

3. The vehicle remote control system of claim 1, wherein the first component is selected from the group consisting of a multimedia device, a lighting device, a horn, and an HVAC, and the second component is selected from the group consisting of an outlet power supplier, a seat positioning device, a hood, and a sun roof.

4. The vehicle remote control system of claim 1, wherein the first threshold distance corresponding to the first component and the second threshold distance corresponding to the second component are adjustable.

5. The vehicle remote control system of claim 2, wherein when the first component is an ignition, the first threshold distance is 1 mile and the operating instruction signal includes instruction to activate the ignition.

6. The vehicle remote control system of claim 5, wherein when the second component is a door lock, the second threshold distance is 100 feet and the operating instruction signal includes instruction to unlock the door lock.

7. The vehicle remote control system of claim 1, wherein the controller is configured to:
   receive image data from an imaging device of the vehicle;
   transmit the image data to the remote device;
   determine whether a bypass signal is received from the remote device in response to transmitting the image data to the remote device; and
   transmitting the operating instruction signal to the vehicle in response to a determination that the distance between the vehicle and the remote device exceeds the corresponding threshold distance, and a receipt of the bypass signal from the remote device.

8. A method for operating a vehicle, the method comprising:
   receiving, at a server, location data from the vehicle;
   receiving, at the server, location data from a remote device;
   receiving, at the server, an operating instruction signal from the remote device, the operating instruction signal including instruction to operate one or more components of the vehicle;
   determining a distance between the vehicle and the remote device based on the location data from the vehicle and the location data from the remote device; and
   transmitting the operating instruction signal to the vehicle in response to a determination that the distance between the vehicle and the remote device is equal to or less than a corresponding threshold distance; wherein, the one or more components of the vehicle comprise a first component and a second component; and a first threshold distance corresponding to the first component is different than a second threshold distance corresponding to the second component.

9. The method of claim 8, wherein the first component and the second component of the vehicle are selected from the group consisting of an ignition, a door, a door lock, a hood, a window, and a horn.

10. The vehicle remote control system of claim 8, wherein the first component is selected from the group consisting of a multimedia device, a lighting device, a horn, and an HVAC, and the second component is selected from the group consisting of an outlet power supplier, a seat positioning device, a hood, and a sun roof.

11. The method of claim 8, wherein the first threshold distance corresponding to the first component and the second threshold distance corresponding to the second component are adjustable.

12. The method of claim 9, wherein when the first component is an ignition, the first threshold distance is 1 mile and the operating instruction signal includes instruction to activate the ignition.

13. The method of claim 12, wherein when the second component is a door lock, the second threshold distance is 100 feet and the operating instruction signal includes instruction to unlock the door lock.

14. The method of claim 8, further comprising:
receiving image data from the vehicle;
transmitting the image data to the remote device;
determining whether a bypass signal is received from the remote device in response to transmitting the image data to the remote device; and
transmitting the operating instruction signal to the vehicle in response to a determination that the distance between the vehicle and the remote device exceeds the corresponding threshold distance, and a receipt of the bypass signal from the remote device.

* * * * *